US008763829B2

(12) United States Patent
Madaus

(10) Patent No.: US 8,763,829 B2
(45) Date of Patent: Jul. 1, 2014

(54) COLLAPSIBLE CONTAINER FOR HOLDING LIQUIDS OR OBJECTS

(76) Inventor: Craig Allen Madaus, New York, NY (US)

( * ) Notice: Subject to any disclaimer, the term of this patent is extended or adjusted under 35 U.S.C. 154(b) by 48 days.

(21) Appl. No.: 13/440,360

(22) Filed: Apr. 5, 2012

(65) Prior Publication Data

US 2013/0020276 A1     Jan. 24, 2013

Related U.S. Application Data

(60) Provisional application No. 61/510,873, filed on Jul. 22, 2011.

(51) Int. Cl.
*B65D 47/12*     (2006.01)
*B65D 5/36*     (2006.01)

(52) U.S. Cl.
USPC ............. 215/44; 215/274; 215/277; 215/294; 215/329; 215/363; 215/387; 215/900; 220/254.7; 220/259.3; 220/319; 220/666; 220/801

(58) Field of Classification Search
USPC .......... 215/11.3, 900, 11.1–11.5, 42–44, 274, 215/275, 277, 294–300, 306, 320, 321, 215/329–340, 349–351, 355–364, 370, 371, 215/379–385, 387; 220/666, 907, 254.7, 220/254.8, 259.3, 259.4, 315, 319, 220/787–791, 799–804
See application file for complete search history.

(56) References Cited

U.S. PATENT DOCUMENTS

| | | | | |
|---|---|---|---|---|
| 1,334,344 A * | 3/1920 | Beatty | ............................ | 222/542 |
| 1,504,920 A * | 8/1924 | Viegelmann | ..................... | 222/92 |
| 1,575,567 A * | 3/1926 | Geake | ............................. | 222/92 |
| 2,258,395 A * | 10/1941 | Tome | ............................. | 222/107 |
| 2,268,993 A * | 1/1942 | Sanders | ........................... | 222/92 |
| 2,446,451 A * | 8/1948 | Allen | ............................ | 215/11.1 |
| 2,508,481 A * | 5/1950 | Allen | ............................ | 215/11.3 |
| 2,780,378 A * | 2/1957 | Romano | ...................... | 215/11.1 |
| 2,864,529 A * | 12/1958 | Henchert | ...................... | 220/729 |
| 3,039,648 A * | 6/1962 | Busch | .................... | 252/62.51 R |
| 3,124,273 A * | 3/1964 | Remington et al. | ............. | 222/92 |
| 3,406,853 A * | 10/1968 | McLeod | ...................... | 215/11.3 |
| 3,424,218 A * | 1/1969 | Vanderbur, Jr et al. | ........ | 215/247 |
| 3,717,274 A * | 2/1973 | Wingardh | ..................... | 215/373 |

(Continued)

FOREIGN PATENT DOCUMENTS

KR     1020050008467 B1 * 8/2006
WO     WO 2006050620 A1 * 5/2006

*Primary Examiner* — Anthony Stashick
*Assistant Examiner* — Ned A Walker
(74) *Attorney, Agent, or Firm* — Studebaker & Brackett PC

(57) ABSTRACT

A segmented collapsible container for containing a liquid and collapsing when no liquid is present. The container is segmented into a first portion, a second portion, and a third portion. The three segmented portions form a uniform annular sidewall, with each separate portion of the sidewall having a different thickness or material than the other portions. The middle second portion includes a relatively thinner break point in the sidewall to facilitate collapsing. It is this variation in rigidity and integrity of the sidewalls that allows the segmented collapsible container to collapse. The segmented collapsible container includes an airtight seal formed in the first portion that restricts fluids, such as but not limited to, air from entering or leaving the segmented collapsible container. The segmented collapsible container may more easily return to its original shape after collapsing. This facilitates cleaning and reusability of the container.

14 Claims, 3 Drawing Sheets

(56) References Cited

U.S. PATENT DOCUMENTS

| | | | | |
|---|---|---|---|---|
| 3,784,039 A * | 1/1974 | Marco | | 215/11.3 |
| 3,786,221 A * | 1/1974 | Silverman | | 219/770 |
| 4,512,172 A * | 4/1985 | Abbott et al. | | 72/68 |
| 4,540,544 A * | 9/1985 | Jakobsen et al. | | 264/532 |
| 4,566,600 A * | 1/1986 | Chang | | 215/371 |
| 4,591,060 A * | 5/1986 | Tsukada et al. | | 215/42 |
| D292,555 S * | 11/1987 | Chesterfield | | D9/683 |
| 4,930,644 A * | 6/1990 | Robbins, III | | 215/382 |
| 4,979,628 A * | 12/1990 | Robbins, III | | 215/395 |
| 5,027,963 A * | 7/1991 | Robbins, III | | 215/395 |
| D321,404 S * | 11/1991 | Falini | | D26/2 |
| 5,066,528 A * | 11/1991 | Krishnakumar et al. | | 428/36.92 |
| 5,085,904 A * | 2/1992 | Deak et al. | | 428/35.7 |
| D330,993 S * | 11/1992 | Robbins, III | | D7/510 |
| 5,174,458 A * | 12/1992 | Segati | | 215/383 |
| 5,174,460 A * | 12/1992 | Minnette | | 215/335 |
| 5,176,278 A * | 1/1993 | Quarberg | | 220/320 |
| 5,191,987 A * | 3/1993 | Niimi et al. | | 215/379 |
| 5,201,438 A * | 4/1993 | Norwood | | 220/666 |
| 5,226,551 A * | 7/1993 | Robbins, III | | 220/8 |
| 5,240,130 A * | 8/1993 | Osbakk | | 215/12.1 |
| 5,281,387 A * | 1/1994 | Collette et al. | | 264/521 |
| 5,392,941 A * | 2/1995 | Robbins, III | | 220/8 |
| 5,417,337 A * | 5/1995 | Robbins, III | | 220/8 |
| 5,467,888 A * | 11/1995 | Brandstrom et al. | | 220/319 |
| D370,388 S * | 6/1996 | Cusick et al. | | D7/512 |
| 5,533,638 A * | 7/1996 | Robbins, III | | 220/8 |
| 5,547,275 A * | 8/1996 | Lillelund et al. | | 366/130 |
| 5,549,213 A * | 8/1996 | Robbins et al. | | 220/8 |
| 5,562,221 A * | 10/1996 | Beniacar | | 215/386 |
| 5,573,129 A * | 11/1996 | Nagata et al. | | 215/382 |
| 5,575,398 A * | 11/1996 | Robbins, III | | 220/8 |
| 5,588,544 A * | 12/1996 | Takashima et al. | | 215/42 |
| 5,778,723 A * | 7/1998 | Diekhoff | | 72/356 |
| 5,780,130 A * | 7/1998 | Hansen et al. | | 428/35.7 |
| 5,791,503 A * | 8/1998 | Lyons | | 215/11.5 |
| D401,344 S * | 11/1998 | Bonds | | D24/197 |
| 5,900,293 A * | 5/1999 | Zettle | | 428/12 |
| D414,113 S * | 9/1999 | Thatcher | | D9/520 |
| 6,065,603 A * | 5/2000 | Filice et al. | | 206/519 |
| 6,155,452 A * | 12/2000 | Laurent | | 220/739 |
| 6,311,865 B1 * | 11/2001 | Laurent | | 220/739 |
| 6,341,706 B1 * | 1/2002 | Neuner | | 215/40 |
| 6,372,318 B1 * | 4/2002 | Collette et al. | | 428/35.7 |
| 6,375,020 B1 * | 4/2002 | Marquez | | 215/232 |
| 6,409,033 B1 * | 6/2002 | Wilhite et al. | | 215/228 |
| D465,697 S * | 11/2002 | Renz | | D7/376 |
| D470,753 S * | 2/2003 | Kunesh et al. | | D9/521 |
| 6,588,614 B2 * | 7/2003 | Neuner | | 215/40 |
| 6,616,319 B2 * | 9/2003 | Renz | | 366/130 |
| 6,702,143 B2 * | 3/2004 | Wang | | 220/666 |
| 6,837,392 B2 * | 1/2005 | Laurent | | 220/259.3 |
| D517,412 S * | 3/2006 | Walters | | D9/521 |
| D517,919 S * | 3/2006 | Walters | | D9/521 |
| 7,036,678 B2 * | 5/2006 | Renz | | 366/130 |
| 7,201,291 B2 * | 4/2007 | Vigny et al. | | 222/107 |
| 7,326,234 B2 * | 2/2008 | Lieberman et al. | | 606/236 |
| 7,571,830 B2 * | 8/2009 | Lin | | 220/212 |
| 7,798,425 B2 * | 9/2010 | Joseph et al. | | 239/345 |
| 7,938,281 B2 * | 5/2011 | Horntrich et al. | | 215/11.6 |
| 8,113,364 B1 * | 2/2012 | Asadi | | 215/6 |
| 8,365,941 B2 * | 2/2013 | Mayer | | 220/259.3 |
| D677,796 S * | 3/2013 | Barlow | | D24/197 |
| 8,387,819 B2 * | 3/2013 | Chu et al. | | 220/666 |
| 8,397,926 B2 * | 3/2013 | Driver et al. | | 215/11.3 |
| 8,534,478 B2 * | 9/2013 | Mays et al. | | 215/381 |
| 2002/0166837 A1 * | 11/2002 | Gonzalez | | 215/382 |
| 2003/0024895 A1 * | 2/2003 | Meyers et al. | | 215/11.5 |
| 2003/0034321 A1 * | 2/2003 | Wu | | 215/11.5 |
| 2003/0066838 A1 * | 4/2003 | Wang | | 220/660 |
| 2003/0102278 A1 * | 6/2003 | Chupak | | 215/40 |
| 2003/0230575 A1 * | 12/2003 | Laurent | | 220/254.8 |
| 2004/0211747 A1 * | 10/2004 | Whitley | | 215/382 |
| 2004/0222238 A1 * | 11/2004 | Vigny et al. | | 222/107 |
| 2004/0256485 A1 * | 12/2004 | Joseph et al. | | 239/302 |
| 2005/0006334 A1 * | 1/2005 | Luker | | 215/334 |
| 2005/0258271 A1 * | 11/2005 | Kosmyna et al. | | 239/327 |
| 2006/0016819 A1 * | 1/2006 | Paslawski et al. | | 220/666 |
| 2006/0180585 A1 * | 8/2006 | Cunningham et al. | | 220/203.06 |
| 2006/0237471 A1 * | 10/2006 | Aafjes | | 220/780 |
| 2006/0243695 A1 * | 11/2006 | Littell | | 215/11.1 |
| 2007/0045215 A1 * | 3/2007 | Holley et al. | | 215/11.4 |
| 2007/0090078 A1 * | 4/2007 | Laveault et al. | | 215/12.2 |
| 2007/0181520 A1 * | 8/2007 | Holley et al. | | 215/11.1 |
| 2008/0041807 A1 * | 2/2008 | Tominaga | | 215/11.3 |
| 2008/0302756 A1 * | 12/2008 | Phillips | | 215/329 |
| 2008/0302797 A1 * | 12/2008 | Phillips | | 220/266 |
| 2009/0108009 A1 * | 4/2009 | Yeung | | 220/737 |
| 2009/0266737 A1 * | 10/2009 | Cole | | 206/499 |
| 2010/0140279 A1 * | 6/2010 | Tyson et al. | | 220/666 |
| 2010/0193460 A1 * | 8/2010 | Driver et al. | | 215/11.3 |
| 2011/0006028 A1 * | 1/2011 | Caldwell | | 215/11.1 |
| 2011/0114649 A1 * | 5/2011 | Adams et al. | | 220/601 |
| 2011/0155684 A1 * | 6/2011 | Sirota | | 215/11.5 |
| 2011/0266246 A1 * | 11/2011 | Itzek | | 215/11.6 |
| 2011/0303629 A1 * | 12/2011 | Wong | | 215/11.5 |
| 2011/0303685 A1 * | 12/2011 | Nakatani et al. | | 220/660 |
| 2012/0181246 A1 * | 7/2012 | Ross et al. | | 215/40 |

* cited by examiner

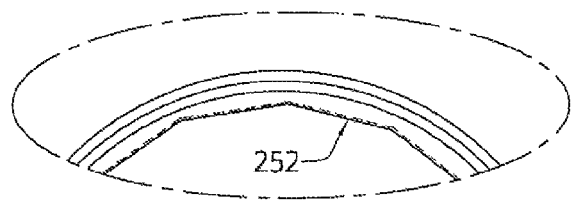
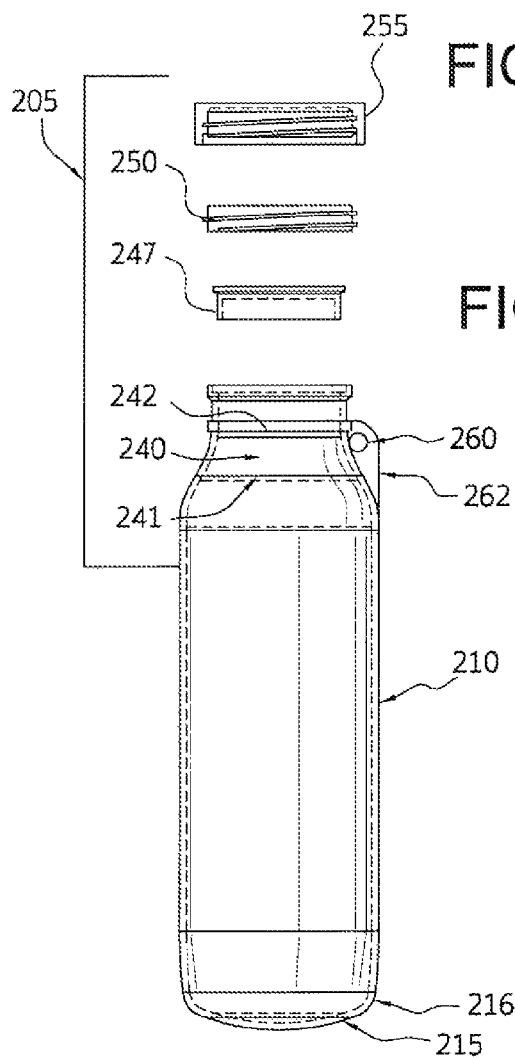
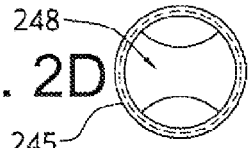
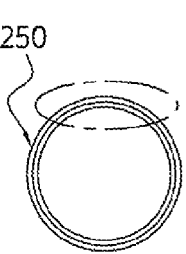
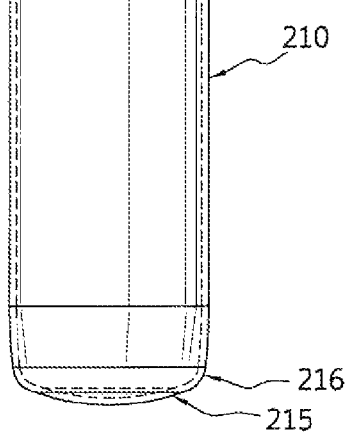
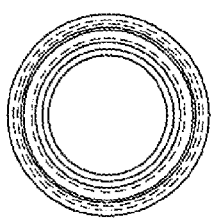

COLLAPSIBLE CONTAINER FOR HOLDING LIQUIDS OR OBJECTS

CROSS-REFERENCE TO RELATED APPLICATIONS

The present Utility patent application claims priority benefit of the U.S. provisional application for patent Ser. No. 61/510,873 entitled "scrunchable BOTTLE", filed on 22 Jul. 2011 under 35 U.S.C. 119(e). The contents of this related provisional application are incorporated herein by reference for all purposes to the extent that such subject matter is not inconsistent herewith or limiting hereof.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

TECHNICAL FIELD

One or more embodiments of the invention generally relate to liquid containers. More particularly, one or more embodiments of the invention relate to collapsible liquid containers.

BACKGROUND

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Many liquid containers are not collapsible, however, there are collapsible liquid containers. Typically, liquid containers that are collapsible do not return to an original shape easily. Further, liquid containers typically fill with air when at least partially empty. Although air can be squeezed out by collapsing some liquid containers, it is typically not possible to purge almost all air from the liquid container.

Reusable liquid containers are often difficult to clean. Some liquid containers are prone to collect mold, fungi or bacteria. Further, many liquid containers are constructed of materials which affect a beverage inside of the liquid container. Sometimes this can result in health issues or decreased enjoyment of the beverage.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A illustrates a schematic side view of an exemplary liquid container and coupling mechanism according to an embodiment of the present invention;

FIG. 2B is a side view of a container;

FIG. 2C is a top plan view thereof;

FIG. 2D illustrates the strainer of the retainer;

FIG. 2E is a top view of the cap;

FIG. 2F illustrates the sleeve fitted for an exterior groove of the container;

FIG. 2G is an enlarged view of the area encircled in FIG. 2F; and

Figure 1:
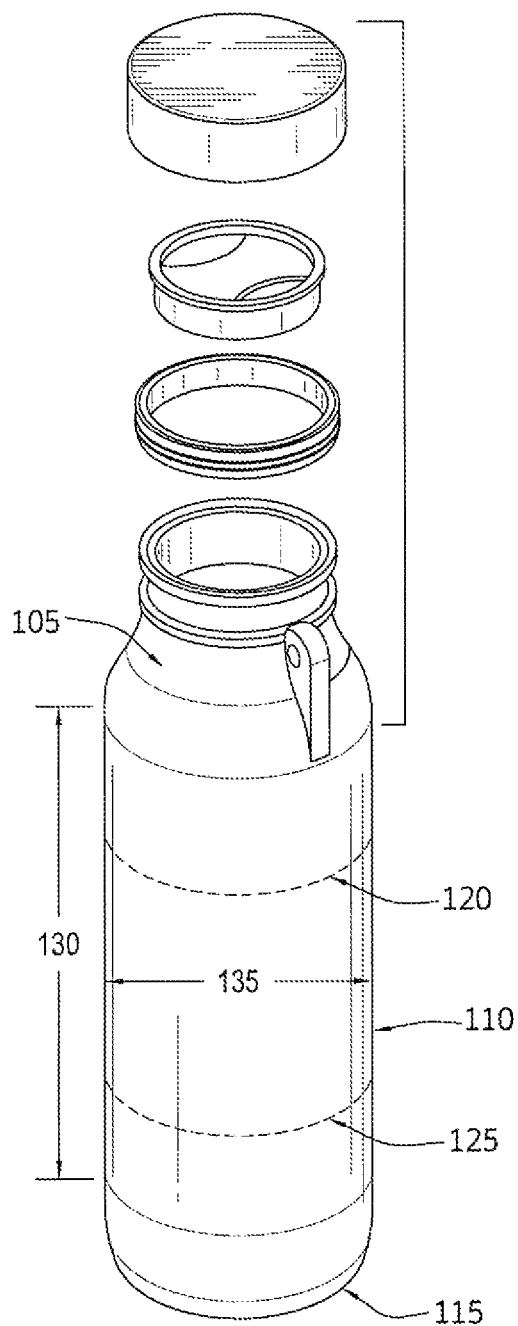
FIG. 1 illustrates an exploded side view of an exemplary liquid container according to an embodiment of the present invention.

Unless otherwise indicated illustrations in the figures are not necessarily drawn to scale.

DETAILED DESCRIPTION

Embodiments of the present invention are best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details. FIG. 1 illustrates a side view of an exemplary segmented collapsible container according to an embodiment of the present invention. The liquid container includes a first portion 105, a second portion 110, and a third portion 115. In one alternative embodiment, the three segmented portions form a uniform annular sidewall, with each separate portion of the sidewall having a different thickness or material than the other portions. It is this variation in rigidity and integrity of the sidewalls that allows the segmented collapsible container to collapse. In further embodiments, the segmented collapsible container includes an airtight seal formed in the first portion that restrict fluids, such as but not limited to, air from entering or leaving the segmented collapsible container. By restricting the flow of air, the segmented collapsible container may more easily return to its original shape after collapsing. This facilitates cleaning and reusability of the container.

In some embodiments, the second portion 110 is used to hold a fluid. Suitable liquids include, but are not limited to, water, beverages, gasoline, and medicines, laundry soap, soup, motor oil, cooking oil, licquar, vitamins, serums, beverages at sporting events for dry materials, to keep dry flour, match sticks, vitamins, dried spices disposable paper products, live fishing bait, sugar, honey, and dry coffee tea. Suitable fabrication materials for the second portion 110 include, but are not limited to, a silicone, a polypropylene, a polyvinylchloride, a plastic, a plastic, rubber, a silicone oil, a silicone grease, a silicone rubber, and a silicone resin. The material may also have an optional hardness that is noticeable to the user. In some embodiments, the hardness may be in the range of 30 to 75 durometers. However, the hardness range may also be less than 30 durometers, or exceed 75 durometers. In some embodiments, the second portion material does not contain bisphenol a.

In many alternative embodiments, the second portion 110 is collapsible. The second portion also may include a first liquid level 120 and a second liquid level 125. In some embodiments, the second portion 110 is full of the liquid when at the first liquid level 120. When the second portion 110 is at the second liquid level 125 air may enter the second portion 110. In some embodiments, air can be purged from the second portion 110 by flattening or squeezing at least a portion of the second portion 110.

The second portion may include a first dimension 130 and a second dimension 135. The first dimension may be in the range of 2" to 4" inches (5 to 10 cm). The second dimension 135 may be in the range of 4" to 14" inches (10 to 35 cm). However, the dimensions may be greater or less than this range in other embodiments. The second portion may also have a second portion thickness. The second portion thickness may be in the range of 0.006 to 0.016 inches (0.015 to 0.040 cm). However, the thickness may be greater or less than this range in other embodiments. In some embodiments, at least one of the first dimension and the second dimension may be increased or decreased along at least a portion of the second portion 110 by flattening or squeezing at least a portion of the second portion 110. In many embodiments, at least one of the first dimension and the second dimension may be increased or decreased along at least a portion of the second portion 110 by adding the liquid to at least a portion of the second portion 110. The second portion 110 may also include a volume. The volume may be in the range of 8 to 60 ounces inches (0.237 to 1.775 liters). However, in other embodiments of the present invention that contain creams, lotions, glue, or paint, the volume may be less.

FIGS. 2A-2G illustrate a schematic view of an exemplary liquid container 210 according to an embodiment of the present invention. The exploded coupling/sealing mechanism 205 may include at least one of a mouth 240 of the container, a retainer 245, a sleeve or thread ring 250, and a cap 255. In some embodiments, the mouth 240 may have a first diameter 241 and a second diameter 242. The first diameter 241 may be in the range of 1.5 to 3.5" inches (3.8 to 8.9 cm). Suitable materials for the mouth 240 include, but are not limited to, a silicone, a polypropylene, a polyvinylchloride, a plastic, a plastic, rubber, a silicone oil, a silicone grease, a silicone rubber, and a silicone resin. In some embodiments, a groove may be disposed in the mouth.

The liquid container 210 may also include a retainer 245. The retainer 245 may be removably disposed in the mouth 240. In some embodiments, at least a portion of the retainer 245 fits into the groove in the month 240. Suitable materials for the retainer 245 include, but are not limited to, a silicone, a polypropylene, a polyvinylchloride, a plastic, a plastic, rubber, VITON, BUTYL, EPDM Teflon® nonstick coating, stainless steel, titanium, a silicone oil, a silicone grease, a silicone rubber, and a silicone resin, Poly ethelyne VITON, BUTYL, EPDM Teflon®, stainless steel, titanium. In some embodiments, the retainer 245 may include at least one of a top diameter 246 and a bottom diameter 247. The top diameter 246 may be in the range of 1 to 2.36 inches (25 to 60 mm). The bottom diameter 247 may be in the range of 0.75 to 2.16 inches (20 to 55 mm).

In some embodiments, a strainer or filter 248 may disposed in the retainer 245. The filter may keep solids, including but not limited to, ice, from exiting the liquid container 210. In many embodiments, the filter 248 is configured to prevent solids greater than a predetermined size from passing through the mouth 240. Suitable filters include, but are not limited to, metal wire mesh filters and plastic filters charcoal, stainless steel, ceramic, polymide, Teflon, and titanium. In one alternative embodiment, the filter is a charcoal filter that is efficacious in filtering nonfiltered water. The charcoal filter may be fabricated from, but not limited to polyethelyne, stainless steel, Teflon® nonstick coating, or titanium PP. In some embodiments, the retainer 245 may additionally include a spout. The spout may be used for drinking or pouring.

The liquid container 210 may also include a sleeve or thread ring 250. In some embodiments the sleeve or thread ring includes an internal joining mechanism 252. In many embodiments, the joining mechanism is configured to couple the sleeve or thread ring 250 with the mouth 240. Those skilled in the art can appreciate that configuring the joining mechanism 252 with sixteen linear surfaces to form "flat spots" may create a more secure engagement between the thread ring and the mouth of the first portion. However, in other embodiments, suitable joining mechanisms include, but are not limited to, a ridge and hexagonal, slotted, or smooth inner surface. In some embodiments, the sleeve or thread ring 250 may also include a joining apparatus. The joining apparatus may be configured to couple the sleeve or thread ring 250 with the cap 255. Suitable shapes for the sleeve or thread ring 250 include, but are not limited to a circle, an oval, a triangle, a rectangle, a square, and a hexagon. Suitable materials for the sleeve or thread ring 250 include, but are not limited to, a silicone, a polypropylene, a polyvinylchloride, a plastic, a plastic, rubber, a silicone oil, a silicone grease, a silicone rubber, and a silicone resin, stainless steel, Teflon® nonstick coating, titanium.

The liquid container 210 may also include a cap 255. Suitable materials for the cap 255 include, but are not limited to, a silicone, a polypropylene, a polyvinylchloride, a plastic, a plastic, rubber, a silicone oil, a silicone grease, a silicone rubber, and a silicone resin, stainless steel, Teflon® nonstick coating, or titanium. In some embodiments, at least one of the mouth 240, the retainer 245, the thread ring 250, and the cap 255 create an airtight seal. In many embodiments, at least one of the mouth 240, the retainer 245, the sleeve 250, and the cap 255 create a leak resistant seal. In some embodiments, a leak resistant ring is disposed in the cap 255. In an alternative embodiment, the cap may include an o-ring on the inner circumference to secure the retainer in place and create a spill proof, leak resistant segmented collapsible container.

Those skilled in the art can appreciate that in one embodiment, utilizing silicone having a hardness of 50 durometers to fabricate the segmented collapsible container provides sufficient rigidity for containing a liquid, and perpetually collapsing and returning to an extended position the segmented collapsible container.

The liquid container 210 may also include a coupling tab mechanism 260. The coupling mechanism may be configured to attach to an item. Suitable items include, but are not limited to, a carabiner, a hook, a strap, and a charm, trinket, made from aluminum, plastic, leather, jewels, string, or rubber. In some embodiments the coupling tab mechanism 260 is disposed on a tab 262. In many embodiments, the tab 262 is configured to fold. Suitable materials for the tab 262 include, but are not limited to, a silicone, a polypropylene, a polyvinylchloride, a plastic, a plastic, rubber, a silicone oil, a silicone grease, a silicone rubber, and a silicone resin polyethelyne, stainless steel, Teflon® nonstick coating, or titanium.

The bottom portion 215 of container 210 may include a bottom 216. Suitable materials for the bottom 216 include, but are not limited to, a silicone, a polypropylene, a polyvinylchloride, a plastic, a plastic, rubber, a silicone oil, a silicone grease, a silicone rubber, and a silicone resin. Suitable shapes for the bottom 216 include, but are not limited to a circle, an oval, a triangle, a rectangle, a square, and a hexagon. In some embodiments, the bottom 216 is convex. In other embodiments, the bottom 216 is CONCAVE. In many embodiments, the bottom 216 includes a thickness. The thickness may be in the range of 0.023 to 0.070 inches (0.6 to 1.8 mm). However, the thickness may also be greater than or less than this range in alternative embodiments.

Figure 3:
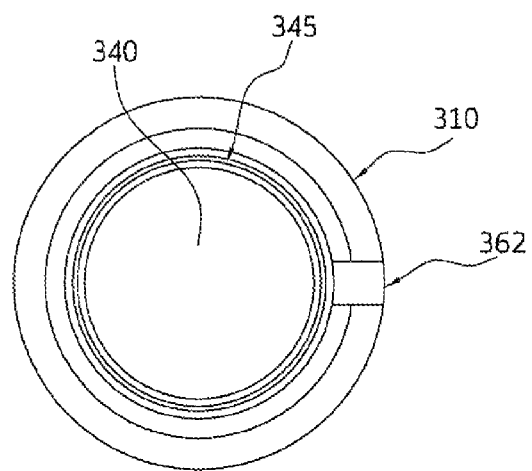
FIG. 3 illustrates a top view of an exemplary liquid container according to an embodiment of the present invention.

FIG. 3 illustrates a top view of another exemplary liquid container according to an embodiment of the present invention. In some embodiments, the liquid container 300 includes at least one of, a second portion 310, a mouth 340, a tab 362, and a retainer 345. In many embodiments, at least one of the first portion, the second portion and the third portion is dishwasher safe. In some embodiments, at least one of the first portion, the second portion and the third portion is resistant to a contaminant. Suitable contaminants include, but are not limited to, mold, fungi and bacteria.

Those skilled in the art can appreciate that the segmented collapsible container may have numerous benefits when configured as a baby bottle. In one embodiment, manufacturing a smaller segmented collapsible container would allow the baby to grasp the segmented collapsible bottle as a bottle. Further, by adding an appropriate nipple to the cap, air would be restricted from entering the bottle, and the baby would avoid inhaling air and getting a stomach ache. Alternative embodiments of the fabrication of the present invention, whether in the form of a baby bottle or not, may also include antibacterial materials.

All the features or embodiment components disclosed in this specification, including any accompanying abstract and drawings, unless expressly stated otherwise, may be replaced by alternative features or components serving the same, equivalent or similar purpose as known by those skilled in the art to achieve the same, equivalent, suitable, or similar results by such alternative feature(s) or component(s) providing a similar function by virtue of their having known suitable properties for the intended purpose. Thus, unless expressly stated otherwise, each feature disclosed is one example only of a generic series of equivalent, or suitable, or similar features known or knowable to those skilled in the art without requiring undue experimentation.

Having fully described at least one embodiment of the present invention, other equivalent or alternative methods of implementing liquid containers according to the present invention will be apparent to those skilled in the art. The invention has been described above by way of illustration, and the specific embodiments disclosed are not intended to limit the invention to the particular forms disclosed. The particular implementation of the liquid containers may vary depending upon the particular context or application. By way of example, and not limitation, the liquid containers described in the foregoing were principally directed to collapsible liquid container implementations; however, similar techniques may instead be applied to containers for gases, gels or solids which implementations of the present invention are contemplated as within the scope of the present invention. The invention is thus to cover all modifications, equivalents, and alternatives falling within the spirit and scope of the following claims.

Claim elements and steps herein may have been numbered and/or lettered solely as an aid in readability and understanding. Any such numbering and lettering in itself is not intended to and should not be taken to indicate the ordering of elements and/or steps in the claims.

What is claimed is:

1. A segmented collapsible container comprising:
    a first portion including a neck defining a mouth, said first portion being configured to control a flow of a fluid, said neck including a groove surrounding said mouth;
    a second portion, said second portion being configured to receive a predetermined quantity of liquid, said second portion further being configured with a sidewall;
    a third portion, said third portion being configured to provide a base for said segmented collapsible container; and
    a coupling mechanism for sealing the container, the coupling mechanism including an annular retainer, an annular sleeve and a cap, said annular retainer being located on an internal side of said first portion and said annular sleeve being located on an external side of said first portion opposite to said internal side, said annular sleeve being seated within said groove and said cap threadingly engaging said annular sleeve,
    said annular retainer and said annular sleeve being aligned with each other on opposite sides of said first portion,
    a height of said annular retainer being at least equal to a height of said annular sleeve.
2. The segmented collapsible container of claim 1, wherein said second portion is configured to collapse.
3. The segmented collapsible container of claim 1, wherein said annular retainer restricts movement of solids.
4. The segmented collapsible container of claim 1, wherein said first, second and third portions are made of silicone.
5. The segmented collapsible container of claim 1, wherein said annular retainer includes a top diameter portion and a bottom diameter portion, said top diameter portion being larger than said bottom diameter portion, said top diameter portion extending radially outwardly from said first diameter portion.
6. The segmented collapsible container of claim 5, wherein said annular sleeve includes a plurality of flat portions extending around an inner circumference of said annular sleeve.
7. The segmented collapsible container of claim 6, wherein there are 16 flat portions extending around the inner circumference of said annular sleeve.
8. The segmented collapsible container of claim 6, wherein an outer circumference of said annular sleeve includes threads.
9. The segmented collapsible container of claim 5, wherein said top diameter portion has a dimension in a range of 25 mm to 60 mm, and the bottom diameter portion has a dimension in a range of 20 mm to 55 mm.
10. A segmented collapsible container comprising:
    a first portion including a neck defining a mouth, said first portion being configured to control a flow of a fluid, said neck including a groove surrounding said mouth;
    a second portion, said second portion being configured to receive a predetermined quantity of liquid, said second portion further being configured with a sidewall;
    a third portion, said third portion being configured to provide a base for said segmented collapsible container, an exterior surface of said base having a convex shape; and
    a coupling mechanism for sealing the container, the coupling mechanism including an annular retainer, an annular sleeve and a cap, said annular retainer being located on an internal side of said first portion and said annular sleeve being located on an external side of said first portion opposite to said internal side, said annular sleeve being seated within said groove and said cap threadingly engaging said annular sleeve,
    said annular retainer and said annular sleeve being aligned with each other on opposite sides of said first portion,
    a height of said annular retainer being at least equal to a height of said annular sleeve.
11. The segmented collapsible container of claim 10, wherein said second portion is configured to collapse.
12. The segmented collapsible container of claim 10, wherein said first, second and third portions are made of silicone.
13. The segmented collapsible container of claim 10, wherein said annular retainer includes a top diameter portion and a bottom diameter portion, said top diameter portion being larger than said bottom diameter portion.
14. The segmented collapsible container of claim 13, wherein said annular sleeve includes a plurality of flat portions extending around an inner circumference of said annular sleeve.

* * * * *